(12) United States Patent
Attia et al.

(10) Patent No.: US 8,719,575 B2
(45) Date of Patent: May 6, 2014

(54) METHOD OF SECURE BROADCASTING OF DIGITAL DATA TO AN AUTHORIZED THIRD PARTY

(75) Inventors: Jonathan Attia, Maisons-Alfort (FR); Bernard Pinot, Fontenay (FR)

(73) Assignee: Jonathan Jacob Attia, Maisons-Alfort (FR)

( * ) Notice: Subject to any disclaimer, the term of this patent is extended or adjusted under 35 U.S.C. 154(b) by 788 days.

(21) Appl. No.: 12/988,778

(22) PCT Filed: Mar. 16, 2009

(86) PCT No.: PCT/EP2009/053087
§ 371 (c)(1),
(2), (4) Date: Oct. 20, 2010

(87) PCT Pub. No.: WO2009/130089
PCT Pub. Date: Oct. 29, 2009

(65) Prior Publication Data
US 2011/0035596 A1   Feb. 10, 2011

(30) Foreign Application Priority Data
Apr. 21, 2008   (FR) ..................... 08 02201

(51) Int. Cl.
*H04L 9/32*   (2006.01)
*H04L 29/06*   (2006.01)
*H04N 7/167*   (2011.01)

(52) U.S. Cl.
USPC ........... 713/175; 713/155; 713/156; 713/157; 713/173; 380/200

(58) Field of Classification Search
None
See application file for complete search history.

(56) References Cited

U.S. PATENT DOCUMENTS

| | | | |
|---|---|---|---|
| 2006/0136718 A1* | 6/2006 | Moreillon | 713/155 |
| 2006/0136719 A1* | 6/2006 | Doyle et al. | 713/157 |
| 2006/0206708 A1* | 9/2006 | Son et al. | 713/163 |
| 2006/0271794 A1* | 11/2006 | Nonaka et al. | 713/193 |
| 2007/0240203 A1* | 10/2007 | Beck | 726/4 |
| 2008/0080713 A1* | 4/2008 | Cho et al. | 380/273 |
| 2008/0155254 A1* | 6/2008 | Stradling | 713/157 |
| 2009/0276841 A1* | 11/2009 | Guo et al. | 726/12 |

FOREIGN PATENT DOCUMENTS

| | | |
|---|---|---|
| EP | 0907120 | 4/1999 |
| EP | 1381201 | 1/2004 |
| WO | 2007091002 | 8/2007 |

OTHER PUBLICATIONS

International Search Report for PCT/EP2009/053087, dated Jun. 5, 2009.

* cited by examiner

*Primary Examiner* — Cordelia Zecher
*Assistant Examiner* — Trang Doan
(74) *Attorney, Agent, or Firm* — Day Pitney LLP

(57) ABSTRACT

The invention relates to a method of secure broadcasting of encrypted digital data of a proprietary entity, these data being stored in a storage module (6) of a server (5), comprising: the encryption of the digital data by means of an encryption key for the broadcasting of the digital data to the authenticated third party, and the broadcasting of these digital data to the authenticated third party.

18 Claims, 6 Drawing Sheets

Fig. 10
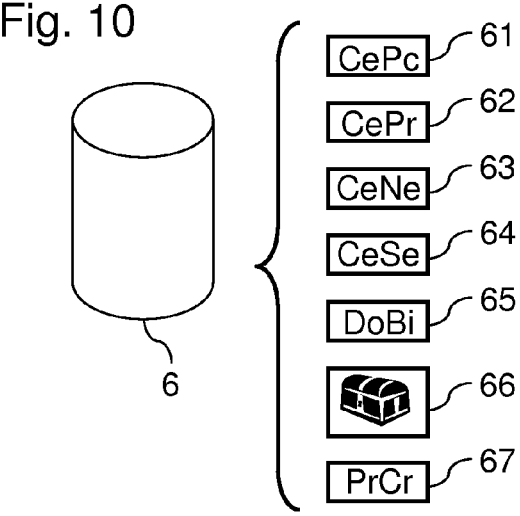
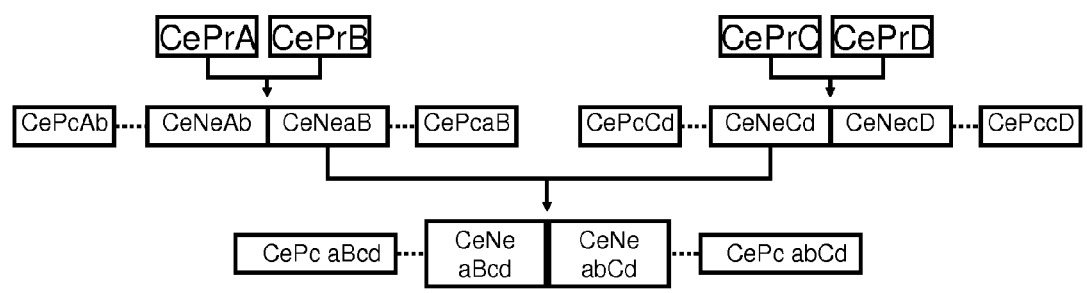
Fig. 11

METHOD OF SECURE BROADCASTING OF DIGITAL DATA TO AN AUTHORIZED THIRD PARTY

CROSS REFERENCE TO RELATED APPLICATIONS

This application is a National Stage of PCT/EP2009/053087, filed on Mar. 16, 2009, and claims priority from FR application Ser. No. 08/02201, filed on Apr. 21, 2008, the contents of which are incorporated herein by reference.

BACKGROUND OF THE DISCLOSED EMBODIMENTS

1. Field of the Disclosed Embodiments

The present invention relates to the field of the securing, storage and control of access to digital data and to its broadcasting.

The present invention pertains more particularly to a method capable of securing data and broadcasting data streams in an autonomous and secured way to fixed or mobile PDA (Personal Digital Assistant) type terminals.

2. Description of the Related Art

In the field of the securing of access to data, there are existing methods in the prior art, already known through the ISO/CEI 9594-8, RFC-2459 and RFC-2510 publications, for making standard public key cryptosystems. The principle of encryption using a public key system relies on the existence of a pair of keys denoted as Ke (private key) and Kq (public key), having values that are different but mathematically related, the keys belonging to a same proprietary entity or owner entity.

Kq is a public key published in a sort of directory as belonging to a certain entity. Thus, any individual can retrieve this key Kq, test its origin and use it to encrypt a message that it wishes to send confidentially to the proprietary or owner entity that owns the key Kq.

Ke is a private key which is known only to its proprietor and must be kept secret. The proprietary entity owning the key Kq uses the key Ke to decrypt the messages that it receives and that have been encrypted with Kq. The most widely known examples of asymmetrical cryptographic protocols called public key protocols are:

the RSA (Rivest, Shamir and Adleman) system based on the factoring of integers;
the Diffie-Hellman key exchange system;
the El Gamal system based on the discrete logarithm.

This system which has been widely adopted relies on schemes of encryption and public key signatures implementing at least one public key infrastructure which shall here below be designated as PKI (Public Key Infrastructure) providing for the authenticity of the public keys used. A certification authority here below designated as CA makes a certain number of checks and, after making these checks, delivers a standardized X.509 digital certificate to a candidate entity and, by affixing its private signature on said digital certificate, certifies the relationship existing between a public key and the identity of the legitimate entity having access to the corresponding private key.

In this context, it is assumed that the entities acting in the exchange of encrypted data streams have prior knowledge of their identities and respective public keys which are recorded and published on said digital certificate.

A digital certificate compliant with the X.509v3 format consists of the following main fields:

Version: indicates the version of X.509 to which the certificate corresponds.
Serial number: serial number of the certificate proper to each PKI.
Algo ID signature: identifier of the type of signature used.
Issuer name: distinctive name of the CA issuing the certificate.
Validity period: validity period.
Subject name: distinctive name of the holder of the public key.
Subject public key info: information (such as value, type of algorithm etc) on the public key of this certificate.
Issuer unique ID: the unique issuer ID of the issuer of this certificate.
Subject unique ID: unique ID of the holder of the public key.
Signature: digital signature of the CA on the previous fields.

Furthermore, the prior art especially knows the making of standard secret key cryptosystems, especially from the publications FIPS-197, RFC2405.

The principle of encryption with a secret key system relies on the existence of a unique secret key denoted as K (with K=Ke=Kq) used for both the encryption and the decryption of data. In practice, it is chiefly stream ciphers that are used when the speed of processing is essential (in telephony, links between central processing units etc). When security predominates, block encryptions or block ciphers are more used. Such cryptosystems have the main advantage of being efficient in terms of computation time for both encrypting and decrypting.

The best known examples of symmetrical cryptographic protocols (with secret keys) are:

The DES (Data Encryption Standard, RFC 2405) system;
The AES (Advanced Encryption Standard, FIPS-197) system;
The 3-DES system;
The IDEA system;
The RC6/RC4 (stream) system.

The major drawback of such cryptosystems, with regard to both the public key and the secret key, lies in the complexity of the administration and management of the keys. What is understood by the management of keys attached to any cryptosystem are the aspects of securing related to the storage, distribution, exchange, archiving, functional diversification, restoration, replacement, revocation and timelines (or history) of the keys.

In addition to this drawback, there is a far more important flaw in present-day cryptosystems especially in the case of the reading of the secured data by a user.

In a public key cryptosystem, the secured data elements are systematically disassociated from the authentication during their interpretation by a user. There is a real risk of usurpation and/or degradation of the contents without any efficient means of checking. It is thus difficult to determine the person who has accessed or modified secured data.

In the case of a secret key cryptosystem, the risk here is centered rather on the confidentiality of the data. During the interpretation by a user of the secured data (the decrypting of the data), this data is vulnerable throughout the reading period. There is a then a real risk of interception, of fraudulent passive listening or again of diversion of this data.

Furthermore, the lack of interoperability between cryptosystems, whether of the PKI or of the secret key type is a major obstacle to their deployment in companies. The well-known complexity of the prior art for cross-certification between PKIs or again their incompatibility with the encrypting techniques of a secret key cryptosystem will be noted. It is thus difficult for an entity to set up a policy of security with several other entities using distinct cryptosystems.

BRIEF SUMMARY OF THE DISCLOSED EMBODIMENTS

The invention thus relates to a method of secured broadcasting of encrypted digital data of a proprietary entity, this data being stored in a storage module of a server comprising the steps of:

- in an authentication module hosted by a server, making a strong authentication of a third party requesting the broadcasting of encrypted digital data of the proprietary entity;
- once the third party has been authenticated, decrypting a private digital certificate of the third party with a first symmetrical encryption key dedicated to the authenticated third party, the private digital certificate of the third party being stored in a storage module of a server and comprising a pair of asymmetrical encryption keys;
- by means of the private key of said pair of keys, decrypting a digital certificate pre-negotiated with the proprietary entity and comprising a symmetrical encryption key for the broadcasting of the data to the authenticated third party, the negotiated digital certificate being stored in a storage module of a server;
- once the negotiated digital certificate is decrypted, reading an access policy certificate prepared by the proprietary entity and defining the rights of access to the encrypted digital data of the proprietary entity, the access policy certificate being stored in a storage module of a server;
- if the access policy certificate authorizes the third party to access the encrypted digital data of the proprietary entity, decrypting the encrypted digital data with a storage symmetrical encryption key contained in the private digital certificate of the proprietary entity, this private digital certificate being stored in a storage module of a server;
- encrypting the digital data by means of the encryption key for the broadcasting of the digital data to the authenticated third party and broadcasting this digital data to the authenticated third party.

According to one variant, the reading of the access policy certificate prepared by the proprietary entity comprises the prior decrypting of this certificate with a symmetrical encryption key contained in the private digital certificate of the proprietary entity.

According to yet another variant, the symmetrical encryption key used to decrypt the access policy certificate is distinct from the storage symmetrical encryption key.

According to another variant, the obtaining of the storage symmetrical encryption key comprises the decrypting of the private digital certificate by means of a first symmetrical encryption key dedicated to the proprietary entity.

According to yet another variant, the method comprises preliminarily:

- the entering of information on the identity of the proprietary entity owning the digital data;
- the generating of the private digital certificate of the proprietary entity containing said information pertaining to its identity and containing said storage symmetrical encryption key;
- the entering a strong authentication element for the proprietary entity owning the data and its storage in a storage module of a server;
- the generating of said first symmetrical encryption key dedicated to the proprietary entity and the associating of this key with the strong authentication element entered;
- the encrypting of the private digital certificate of the proprietary entity with its first symmetrical encryption key and the storing of the encrypted private digital certificate in a storage module of a server.

According to one variant, the method comprises:

- the defining of encryption parameters by the proprietary entity for the storage and access to its digital data elements;
- the generating of the first symmetrical encryption key dedicated to the proprietary entity and the generating of the storage symmetrical encryption key as a function of the defined parameters.

According to yet another variant, the method comprises the retrieval of information on the hardware configuration of a third-party terminal, the generating of a symmetrical encryption key based on this information, the storage of this encryption key in the negotiated digital certificate, the encryption of the digital data to be broadcast by means of this encryption key.

According to another variant, the method comprises:

- the generating of a public digital certificate of the proprietary entity and its storage in a storage module of a server, the public digital certificate being mathematically related to the private digital certificate of the proprietary entity;
- the indexing of information elements on the proprietary entity and the making available of an accessible search engine for the identifying and consulting of the public digital certificate of the proprietary entity by third parties through the entry of information on the proprietary entity by third parties.

According to another variant, the proprietary entity defines restrictions on consultation of its public digital certificate for certain categories of third parties in which the search engine prevents the consultation of the public digital certificate of the proprietary entity for these categories of third parties.

According to one variant, the method comprises:

- the generating of a public digital certificate of the third party and its storage in a storage module of a server, the public digital certificate being mathematically related to the private digital certificate of the third party;
- the indexing of information on the third party and the making available of an accessible search engine for the identifying and consulting of the public digital certificate of the third party by the proprietary entity or by other third parties through their entering of information on third parties.

According to yet another variant, the private digital certificate of the proprietary entity comprises a symmetrical broadcasting encryption key for broadcasting the method to the proprietary entity, the method comprising a request for access by the proprietary entity to its encrypted digital data, a strong authentication of the proprietary entity, the decrypting of the encrypted digital data with the storage symmetrical encryption key, the encryption of the digital data by means of the encryption key for broadcasting to the proprietary entity and the broadcasting of the data thus encrypted to the proprietary entity.

According to another variant, the method comprises the storage of a history or timeline of instances of access to the encrypted digital data of the proprietary entity in a storage module of a server.

According to yet another variant, the method comprises the inclusion of a history or timeline of the instances of access to the digital data encrypted in the digital data broadcast to the authenticated third party.

According to one variant, the method preliminarily comprises:
- the entering of information on the identity of the third party;
- the generating of the private digital certificate of the third party containing said information on its identity containing the pair of asymmetrical encrypting keys;
- the entering of a strong authentication element of the third party and its storage in a storage module of a server;
- the generating of said first symmetrical encryption key dedicated to the third party and the associating of this key with the strong authentication element;
- the encrypting of the private digital certificate of the third party with its first symmetrical encryption key and the storing of the encrypted private digital certificate in a storage module of a server.

According to one variant, the method preliminarily comprises:
- the strong authentication of the proprietary entity and of the third party;
- the defining by the proprietary entity and the third party of broadcasting encryption parameters for digital data of the proprietary entity and the generating of the negotiated digital certificate including these encryption parameters.

According to yet another variant, the method comprises preliminarily to the definition by the proprietary entity and by the third party of the digital data broadcasting encryption parameters:
- the generating of another digital certificate negotiated between a first entity from amongst the third party and the proprietary entity and another third party;
- the publishing of a public digital certificate associated with this negotiated digital certificate;
- the identifying, by a second entity from amongst the third entity and the proprietary entity, of this other digital certificate.

According to another variant the method comprises:
- the strong authentication of the proprietary entity;
- the entry of the parameters of rights of access to the encrypted digital data of the proprietary entity, defining third parties towards whom the digital data can be broadcast and defining the type of access by third parties to this data;
- the generating of the access policy certificate as a function of these parameters and storage in said storage module.

The invention also relates to a system for the secured broadcasting of encrypted digital data comprising:
- an encrypted digital data storage module hosted in a server;
- a module for the strong authentication of users, hosted in a server;
- a private digital certificate storage module for certificates dedicated to respective users, each private digital certificate comprising a first symmetrical encryption key, a pair of asymmetrical encryption keys and a storage symmetrical encryption key dedicated to its user, this storage module being hosted in a server;
- a module for the storage of digital certificates negotiated between two users, each negotiated digital certificate comprising a symmetrical encryption key for the broadcasting of the digital data of one of the two users to the other of the two users, this storage module being hosted in a server;
- a module for the storage of access policy certificates defining the rights of access to the digital data of a user by another user, this storage module being hosted in a server;
- an encryption/decryption module capable of:
  decrypting the private digital certificate of a first user with its first symmetrical encryption key after its authentication;
  decrypting a digital certificate negotiated with a second user by means of the private key of the pair of keys of the first user;
  after the decrypting of the negotiated digital certificate, reading a certificate of policy of access to the digital data defined by the second user;
  if the first user has a right of access to the digital data of the second user, decrypting digital data by means of the storage decryption key of the second user, encrypting the digital data by means of the broadcasting encryption key of the first user, and broadcasting this digital data to the first user.

BRIEF DESCRIPTION OF THE FIGURES

The invention and its other characteristics and advantages will be understood more clearly from the following description given purely by way of an indication, with reference to the appended figures of which:

FIG. 10 illustrates the structure of a global database of a server;

FIG. 11 is a schematic illustration of the certificates implemented during the generation of a certificate negotiated from pre-existing negotiated certificates;

DETAILED DESCRIPTION OF THE DISCLOSED EMBODIMENTS

The invention proposes a method for the secured broadcasting to a third party of encrypted digital data of a proprietary entity stored in a storage module of a server. After a strong authentication of the third party requesting the broadcasting of the data, a private digital certificate of this third party is decrypted with a symmetrical encryption key dedicated to it. Using a private key of a pair of asymmetrical encryption keys contained in the private digital certificate of the third party, a digital certificate negotiated with the proprietary entity is decrypted. The negotiated digital key comprises a symmetrical encryption key for the broadcasting of the data to the third party. Once the decryption of the negotiated digital certificate has been done, an access policy certificate of the proprietary entity is read. This access policy certificate defines the rights of access to the digital data of the proprietary entity. When this certificate authorizes access by the third party, the digital data elements are decrypted with a symmetrical encryption key contained in a private digital certificate of the proprietary entity. The pieces of digital data are then encrypted by means of the encryption key for the broadcasting of the data to the third party, and then the pieces of digital data are broadcast to the third party.

Figure 1:
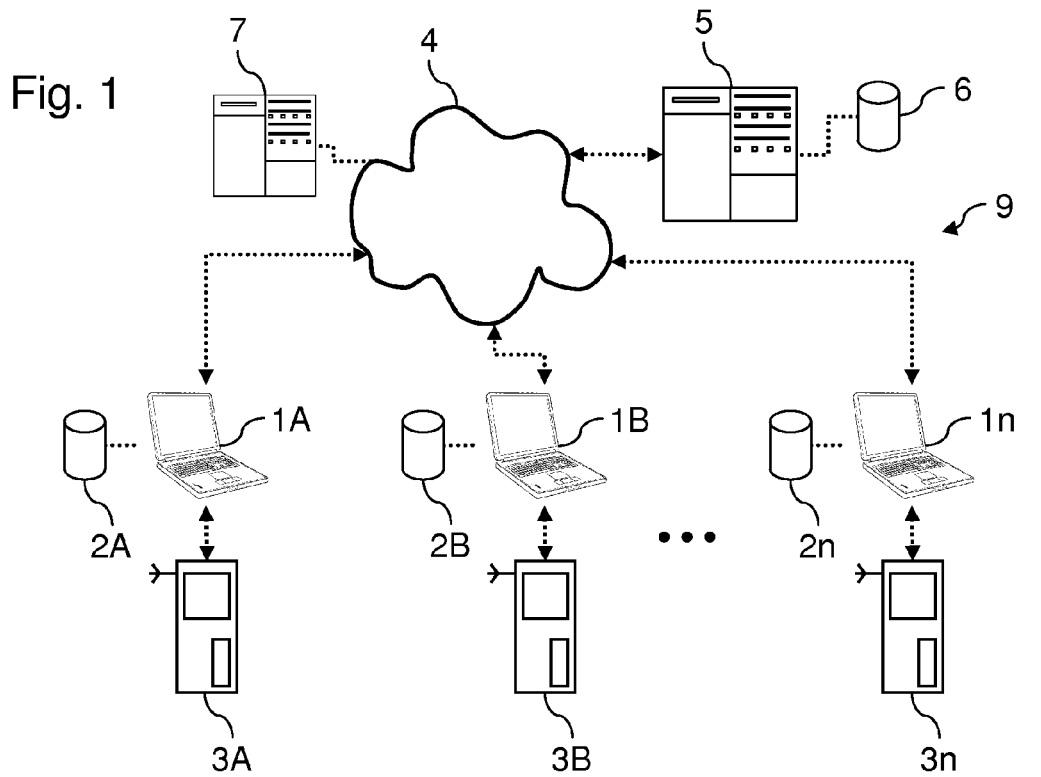
FIG. 1 is a schematic representation of an information-processing communications network in which the invention can be implemented.

FIG. 1 is a schematic view of a system 9 for controlling access to secured data. The system 9 has terminals 1A to 1n such as personal computers, designed to be used by different users. The terminals 1A to 1n respectively have access to databases 2A to 2n typically stored in a premises. The terminals 1A to 1n are capable of communicating with authentication terminals 3A to 3n.

The terminals 1A to 1n are connected to a network 4, in this case the Internet. A server 5 is connected to the network 4 and has an access to a database 6. A dating server 7, such as an NTP server, is connected to the network 4. The server 7 could be used to carry out most of the timestamping operations implemented in the context of the invention.

Figure 2:
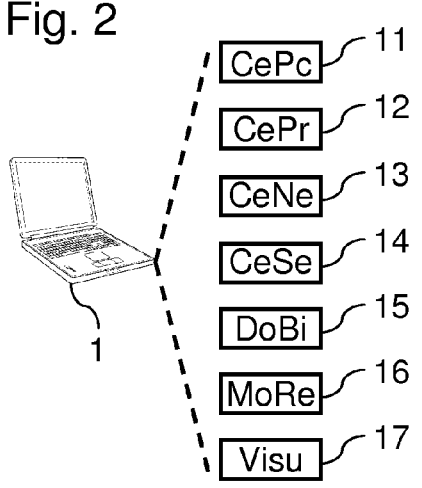
FIG. 2 represents a user terminal and its applications designed to implement the invention.

FIG. 2 shows a terminal 1 and its applications 11 to 17 designed to be executed to implement different functions of the access control. These applications 11 to 17 could be installed in the form of thin clients at the terminal 1.

Figure 3:
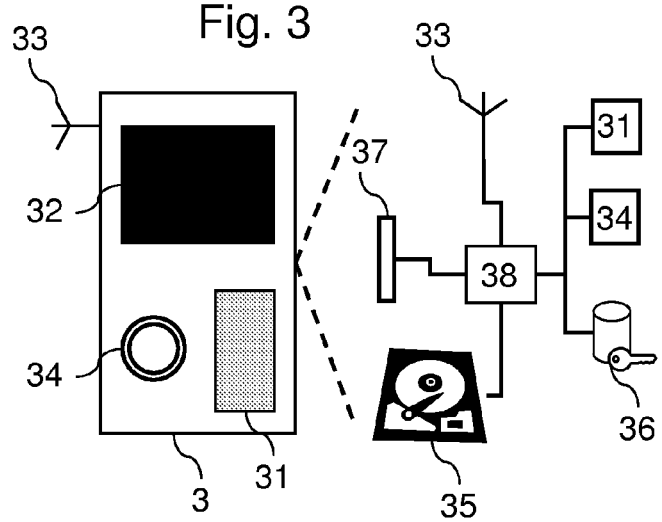
FIG. 3 represents a strong authentication terminal of a user.

FIG. 3 shows an authentication terminal 3. The authentication terminal 3 is designed to enable a strong authentication of a user. The terminal 3 as it happens comprises a fingerprint reader 31, and a retinal print reader 34 in order to implement biometric measurements during the authentication. The terminal 3 also has a screen 32 designed to display messages for the user. The terminal 3 furthermore has a geolocation signal receiver 33, for example a GPS receiver.

The terminal 3 has a processing and control module 38. The module 38 is connected to an input/output interface 37, for example a wired or radiofrequency interface designed to place the terminal 3 in a state of communication with the terminal 1. The geolocation receiver 33 is connected to the module 38. A carrier 35 for the secured storage of data is connected to the processing and control module 38. The module 38 is connected to the biometrical readers 31 and 34 and can communicate with a database 36. The database 36 has a symmetrical encryption key Kst for transmission from the terminal 3. This encryption key Kst will advantageously be defined during the manufacture of the terminal 3 and will be stored in a non-volatile memory. The server 5 preliminarily stores the symmetrical key Kst of the terminal 3 in order to decrypt the data that it receives from this terminal 3.

The terminal 3 is used to record strong authentication references on the server 5 as well as to then authenticate a user during its operations of access to the server 5 by comparison between these references and an instantaneous reading of parameters to be compared with these references. Using an interface not shown, for example a push-button, the user could define the start or the end of a session of use of the authentication terminal 3.

As it happens, during an authentication of a user, the terminal 3 measures a biometrical imprint by means of the readers 31 and 34. The terminal 3 can also comprise a chip-card reader or smart-card reader and a keyboard for entering a personal identification code for the chip card or smart card. In this case, the identifier of the chip card is used so that it can be compared with the reference stored in the server 5. During the authentication, the terminal 3 retrieves a geolocation signal by means of its receiver 33. The terminal 3 extracts its position and the date and the current time therefrom.

During the authentication, the terminal 3 transmits the authentication data (biometrical imprints measured or chip-card references for example) and the date and time extracted from the geolocation signal. Thus, when there is no dating server available, for example if only one connection to the local network is available, it is possible nevertheless to do a timestamping of the strong authentication. This timestamping could especially provide more extensive information for the timeline or history of the operations of access by a user to the server or may make it possible to restrict access to secured data depending on the time of authentication. Advantageously, the position of the terminal 3 is also transmitted to the server 5. Thus, the user's position could be taken into account to restrict access to the secured data. This transmission is encrypted by means of the symmetrical encryption key Kst stored in the terminal 3.

Figure 20:
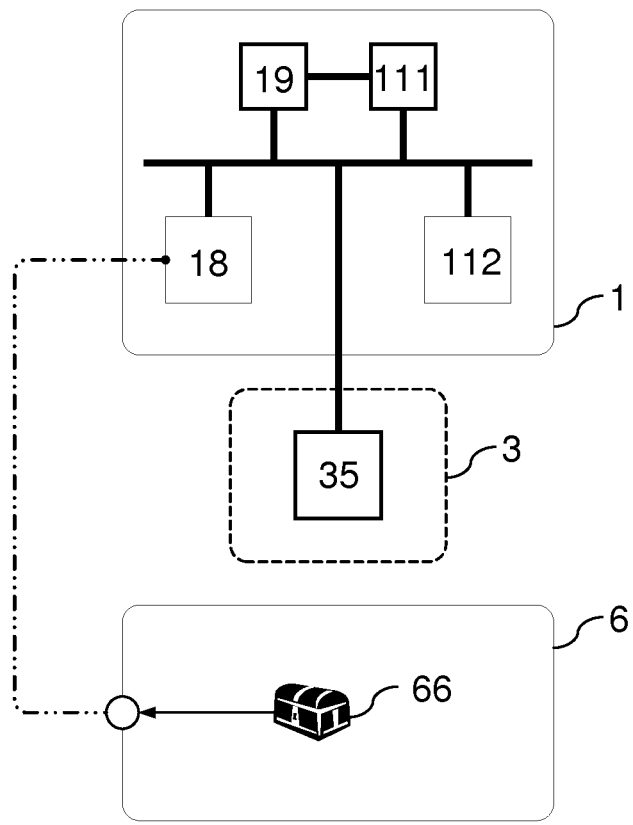
FIG. 20 illustrates the principle of broadcast digital data storage, transferred into the terminal 3.

The secured storage support 35 may be of any appropriate type, for example a hard disk drive or an EEPROM type memory. Depending on the rights of access to the secured data, defined in the access policy certificate described in detail here below, the storage of the secured data in the terminal 1 could be prohibited. The rights of access could require that the secured data coming from the server 5 be stored in the storage support 35, consulted by means of an application 17 through reading of the carrier 35 and then erased from the carrier 35 at the end of a session of use. The application 17 should therefore manage the storage of data in the terminal 3. The exchanges between the application 17 and the storage carrier 35 will advantageously be encrypted. The rights of use in the access policy certificate defined by the proprietor of the secured data could also be applied to the proprietor's own access to the secured data. The data stored in the carrier 35 could undergo a hardwired encrypting operation in order to prevent fraudulent access. As illustrated in FIG. 20, the digital data coming from the base 66 and broadcast to the user of the terminal 3 reach the network card 18 of the terminal 1. The data elements are stored transiently in the carrier 35 of the terminal 3 instead of being stored in a hard disk drive 19 of the terminal 1. The data stored transiently in the carrier 35 are then processed by the central processing unit 111 or transferred to the random-access memory 112 where these data elements cannot be duplicated by a fraudulent third party.

The use of the date extracted by the terminal 3 will also make it possible reinforce security through the cross-checking of a value that may be retrieved on an NTP type server.

The terminal 3 is designed so that it is not personal. To this end, the terminal 3 erases all of its user's personal data at the end of the session, especially data stored in the carrier 35. The terminal 3 can thus be used successively by mutually unrelated users without their personal information becoming vulnerable.

In order to be compatible with different operating systems of the user terminals, the terminal 3 will include APIs that are compatible with several types of operating systems. The terminal 3 could thus be used without distinction by all types of users, thus increasing its ability to be used successively by different users according to their needs. The terminal 3 could send display frames without the data elements themselves being recordable in the terminal 1. The terminal 3 could especially have applications for reading different formats of files in order to enable these types of files to be viewed at the terminal 1.

The interface 37 could especially be a wireless interface (defined by an IEEE 802.11 standard or by an IEEE 802.15 standard) or a wired interface (RJ45 or USB interface for example).

Figure 4:
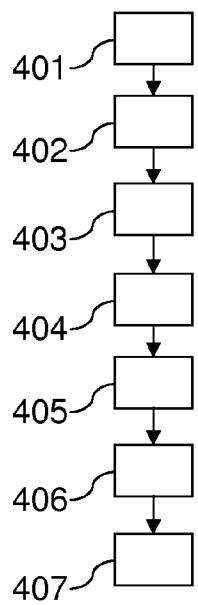
FIGS. 4 to 9 illustrate processes implemented in the context of the invention.

FIG. 4 provides a detailed view of a process for generating a private digital certificate implemented by means of the application 12. During the step 401, the user fills in text fields on the identity of the proprietary entity. These data elements comprise for example a name, a first name, a company name, an attorney, personal particulars etc. The user also fills in any other field that can facilitate his identification or his selection through a filtering operation.

During the step 402, one or more strong authentication references are captured by means of the authentication terminal 3. The strong authentication reference or references are transmitted to the terminal 1.

At the step 403, the user chooses the type of cryptographic protocol and their different encryption parameters. These choices will define the parameters for the storage and transmission of digital data of the user. These parameters could for example define the size of the encryption keys used or the encryption algorithms used.

At the step 404, the set of data retrieved by the terminal 1 is encrypted by means of the symmetrical key Kst stored in the terminal 3.

At the step 405, the terminal 1 transmits the encrypted data to the server 5.

At the step 406, the server 5 generates the private digital certificate CePr and stores it in the database 6. The server 5 dynamically generates the different encryption keys included in the private certificate CePr and generates a first symmetrical encryption key KeS1 which it associates with the user's strong authentication reference. The private certificate CePr is encrypted with this key KeS1.

At the step 407, the server 5 generates a public certificate CePc associated with the private digital certificate CePr and publishes this public certificate CePc. The user could limit or prohibit the publication or consultation of the public certificate CePc at its convenience. The user could use the application 11 subsequently to define whether the publication of the public certificate CePC is authorized, restricted or prohibited (for example whether the public certificate is visible solely upon an invitation sent out by the proprietary entity). The public certificate could be published in a dedicated directory and made public to any user as a function of restrictions on publication.

The private digital certificate CePr could also be completed subsequently by means of the application 12 to include information having no effect on the encrypting. The proprietary entity could for example complement the information fields of its private digital certificate for example by specifying the network address of a server storing the encrypted digital data.

The private digital certificate CePr thus contains essential data elements on the identity of its proprietary entity as well as data elements needed by the cryptosystem. The private digital certificate CePr contains especially:
  one or more strong authentication references (for example fingerprints or retinal prints of the proprietary entity);
  optionally a certificate of the proprietary entity in the X.509 format;
  a second symmetrical encryption key KeS2 dedicated to the encryption of the secured data of the proprietary entity during its storage in the database 6;
  a third symmetrical encryption key KeS3 designed for the encryption of the secured data streams broadcast from the database 6 to the proprietary entity itself;
  a fourth symmetrical encryption key KeS4 designed for the encryption of an access policy certificate;
  a pair of asymmetrical encryption keys Kpr and Kpc designed for the encryption/decryption of certificates negotiated with other entities.

In particular, the private digital certificate could comprise the following fields:
  Val_FPT: binary image of one or more fingerprints;
  Val_Kp: value of the pair of asymmetrical encryption keys Kpr and Kpc;
  Info_Kp: information on the asymmetrical cryptographic protocol chosen;
  Val_Ks: value of the symmetrical encryption key KeS2;
  Info_Ks: information on the cryptographic symmetrical protocol chosen;
  Import_X.509: possibility of importing a digital certificate under the X.509 standard etc;
  CRC: integrity checksum for all the fields;
  SN: unique serial number of said private digital certificate CePr.

The server 5 could have a pair of asymmetrical encryption keys at its disposal to generate the CRC field of a private digital certificate. The value of the CRC field is computed from a non-reversible hash function applied to the information elements contained in this private digital certificate. The private key of this pair of keys is used to encrypt the result of the hash function to generate the CRC field of the private digital certificate. The owner or proprietor of this private digital certificate could thus, by means a particular checking process of the server 5, prove that the certificate has truly been issued by said server. Advantageously, the checking procedure will enable the server 5 to check the authenticity of a private digital certificate imported by its proprietor as follows:
  applying the non-reversible hash function to the information contained in the imported private digital certificate. The result referenced CRC_time is temporarily stored by the server 5;
  encrypting the result CRC_temp with a private key of the pair of asymmetric encrypting keys of the server 5. The result of this encryption is denoted as CRC_time_sig;
  comparing CRC_time_sig with this CRC field of the private digital certificate still stored in the server.

Other checking means could be implemented by the server, especially through the decrypting of the imported CRC field using the public key of the server.

The symmetrical encryption key KeS2 will preferably be sized to obtain a strong encryption of the stored digital data. The symmetrical broadcasting encryption key KeS3 (as well as the key for broadcasting to a third party Kse described in detail here below) will be sized rather to enable transmission and limited processing time for the transmitted secured data. This symmetrical encryption key KeS3 (as well as the key for broadcasting to a third party Kse described in detail here below) could for example be of the 3DES type and could have a size ranging from 64 to 192 bits.

The public certificate CePc is used to guarantee the existence of its associated private digital certificate CePr, thus enabling subsequent initiation of negotiations for access to data by a third party. The public certificate CePc is mathematically linked to the associated private digital certificate so that a third party wishing to verify the validity of this CePc certificate can request a verification made by the server 5. The public certificate CePc could include a digital signature of the associated private certificate CePr, for example a signature by means of a hash function. A third party could thus submit a public certificate CePc to the server 5 which will verify the mathematical link with its associated private digital certificate. The search and consultation of the public certificates of third parties could be done by means of the application 16.

The public certificate CePc could include the following fields:
  Info_User: restricted data for identification of the legitimate holder of the private digital certificate such as name, forenames, pseudonym, etc;

Hash: watermark of the digital certificate CePr guaranteeing the mathematical link with the private digital certificate;

DHC: timestamped date of creation;

SN: unique serial number of said digital certificate CePc.

The public digital certificate CePc and the private digital certificate CePr could be irrevocable and have an unlimited validity time.

At the creation of the private digital certificate CePr, a temporary access policy certificate is advantageously created to define the access policy which will be applied for the broadcasting of the digital data. The temporary access policy certificate could provide for very restrictive default access rights, for example broadcasting limited solely to the proprietary entity.

The application 16 enables a user to search for the public digital certificates of other proprietary entities. The application 16 makes it possible especially to interrogate a database of public digital certificates and select public certificates whose content meets criteria defined by the user. The application 16 enables a viewing of the information provided by a selected public digital certificate. The application 16 can be offset and can be made in the form of a search engine consultable by means of the Internet.

Figure 5:
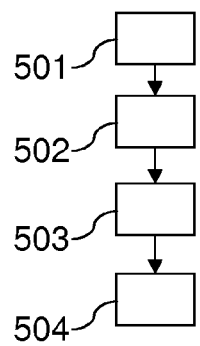

Using their application 13, following an invitation by the owner of the data, or following a request by the third party, the two users initiate a negotiation process. The initial exchanges between the users could be signed, timestamped and then stored by the server 5. FIG. 5 provides a detailed description of the process of negotiation of rights of access between the proprietary entity of the secured data and a third party. The third party itself may be the holder of secured data, and the negotiation may lead to defining a reciprocal right of access to the secured data of the two entities. The users perform this negotiation by means of their application 13 designed to create a negotiated digital certificate CeNe. The exchanges between the users and the server 5 are secured by appropriate encryption.

At the step 501, the third party authenticates itself by means of a strong authentication with the server 5. The application 15 is used especially to transmit biometrical data read on the terminal 3 to the server 5. The data transmitted by the terminal 1 of the third party is compared with a strong authentication reference stored beforehand on the server 5. The third party sends out a request negotiating access to this secured data intended for the owner of this data.

At the step 502, the proprietary entity authenticates itself by means of a strong authentication with the server 5. The proprietary entity accepts the negotiation request. The proprietary entity sends back a proposal defining the conditions of access to these secured data elements. The proprietary entity may especially propose a cryptographic type of protocol for the transmission of the secured data, a desired type of publication of a public digital certificate corresponding to the negotiated certificate CeNe or it may define the lifetime of this negotiated digital certificate (the automatic revocation of the certificate could be managed by this server 5). Various types of publication of the negotiated digital certificate could be envisaged, either by the updating of their respective public digital certificates or by a publication of the corresponding public digital certificate or by keeping this certificate secret.

At the step 503, the conditions of access to the secured data may be subjected to a preliminary negotiation. At the end of this negotiation, the users sign and transmit their acceptance of the conditions to the server 5. The signature could be made with their private key contained in their respective private digital certificate. This signature could be done on a hashing of the values of the negotiated parameters. Their acceptance is timestamped and stored by the server 5.

At the step 504, the server 5 creates and stores a negotiated digital certificate CeNeaB for the third party and a negotiated digital certificate CeNeAb for the proprietary entity. These certificates CeNeaB and CeNeAb are encrypted respectively with the public key KpcB and the public key KpcA contained respectively in the private digital certificate CePrB and CePrA. The access to the data of the negotiated certificate is thus secured both by the strong authentication and by a cryptographic authentication using a private key. To simple the description, A is considered to be a proprietary entity owning digital data and B is considered to be a third party for this data. However, B may be a proprietary entity owning digital data stored in the base 66. A is then considered to be a third party for this data. A same symmetrical encryption key KeSe may be used for the broadcasting of the digital data to the entity that is not the proprietor or owner of this data. It is then possible to envisage a case where the certificates CeNeaB and CeNeAb respectively comprise broadcast encryption keys KeSeB and KeSeA for broadcasting respectively to B and A as third parties.

The negotiated certificates may include the following fields:

SN: unique serial number of said digital certificate.

TTL: period of validity of the certificate;

Val_Emp: watermarks of the private digital certificates used during its generation;

Val_Ks: value of the symmetrical encryption key of broadcasting to the entity that is the entitled holder of the negotiated certificate;

Info_Ks: information on the symmetrical encryption protocol chosen;

Import_X.509: possibility of importing a digital certificate of the standard X.509 etc Hash: integrity checksum of the set of fields.

Figure 6:
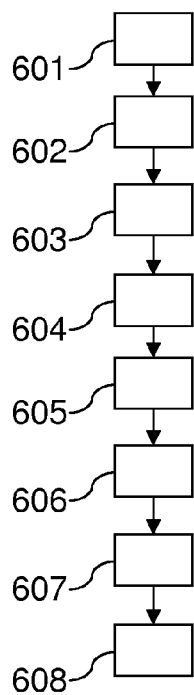

FIG. 6 illustrates a process of access to a user's private digital certificate. This process is implemented especially during the updating of the private certificate or during any operation of access to the secured data.

During a step 601, the user launches the application 12 at his terminal 1. At the step 602, the terminal 1 detects the presence of the authentication terminal 3. During a step 603, the terminal 3 reads a piece of authentication information entered by the user, for example his fingerprint on the reader 31. In a step 601, the authentication information read is transmitted in encrypted form (with the key Kst) to the terminal 1. At a step 605, the terminal 1 makes an encrypted transmission of the authentication information read to the server 5. In a step 606, the server 5 consults the biometric database 65 and compares the authentication information read with the reference stored. During the step 606, the server 5 also compares the timestamp information generated by the terminal 3 with timestamp information provided by the server 7.

At the end of the step 606, once the user has been authenticated, the symmetrical encryption key KeS1 associated with the stored authentication reference is mounted in the memory in the server 5. A symmetrical key is especially appropriate to encrypt the private digital certificate since only the proprietor of the private digital certificate uses it directly. The private digital certificate of the user stored in the database 62 is then decrypted by means of this key KeS1 at the step 607. At the step 608, the values contained in the private digital certificate and needed for the subsequent operations are mounted in a memory in the server 5. A pair of asymmetrical encryption keys Kpc and Kpr is especially loaded into the memory in order to enable the encryption or decryption of the negotiated certificate CeNe.

Figure 7:
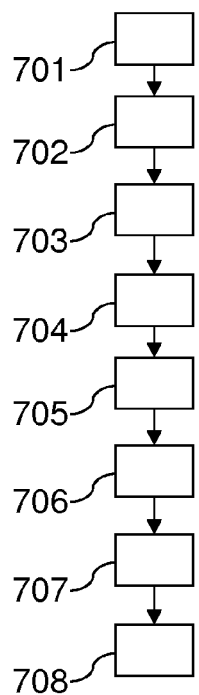

FIG. 7 illustrates a process of access to the different negotiated certificates for which the user is the holder. At the step 701, the user launches the application 13 on his terminal 1. The steps 702 to 705 of strong authentication are identical to the steps 602 to 605. At the step 706, the server 5 consults the biometric database 65 and compares the authentication information read with the reference stored at the end of the step 706. Once the user is authenticated, the private key Kpr of the pair of asymmetrical keys is loaded into the memory. At the step 707, the negotiated certificates of the user stored in the database 63 are decrypted by means of this private key Kpr. At the step 708, the list of its negotiated certificates is transmitted to the user. The transmission of this list is encrypted by means of a session key Kse2.

Figure 8:
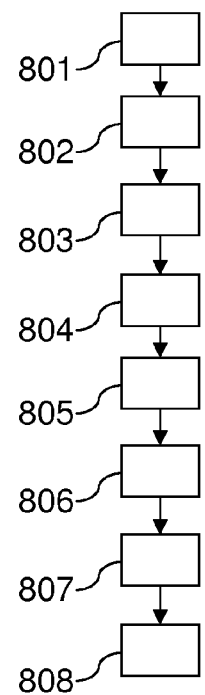

FIG. 8 illustrates a process of definition of the access policy certificate of the proprietary user who is the owner of the digital data. At a step 801, the proprietary entity A launches the application 14 on its terminal 1. The terminal 1 detects the presence of the authentication terminal 3. At a step 802, a strong authentication of the proprietary entity is done as described in detail here above. At the end of the step 802, once the proprietary entity has been authenticated, its symmetrical encryption key KeS1A associated with its authentication reference is loaded into the server 5. The private digital certificate CePrA is then decrypted by means of this key KeS1A at the step 803. The symmetrical encryption key KeS4A is then loaded into the server at the step 804. At the step 805, the proprietary entity defines rights of access: namely which entity has a right of access to the digital data, which rights are associated with each entity (reading, modification, copying, loading limited to a carrier of an authentication terminal etc), restrictions of access as a function of place, time or equipment for connection to the server 5. The access policy certificate could also define whether a timeline of the cases of access should be stored and whether a timeline of the cases of access should be included in the broadcast digital data forming a marker for this data. An access policy certificate CeSeA containing this information is generated at the step 806. The access policy certificate CeSeA is encrypted with the key KeS4A at the step 807. The access policy certificate CeSeA is stored in the database 64 at the step 808.

The proprietary entity could select default access check parameters proposed by the server 5 during the creation of the access policy certificate CeSe. The proprietary entity could for example use a knowledge base of models of access policy certificates to generate its own access policy certificate.

The proprietary entity could subsequently access its access policy certificate through a strong authentication in order to modify the rights of access defined for third parties or for itself to its digital data.

Preferably, the access policy digital certificate CeSe comprises at least the following fields:
SN: unique serial number of this digital certificate;
SN_CeNe: unique serial number corresponding to the CeNe;
IPS: index of the safety parameters corresponding to the model or models of imported access policy.

Figure 9:
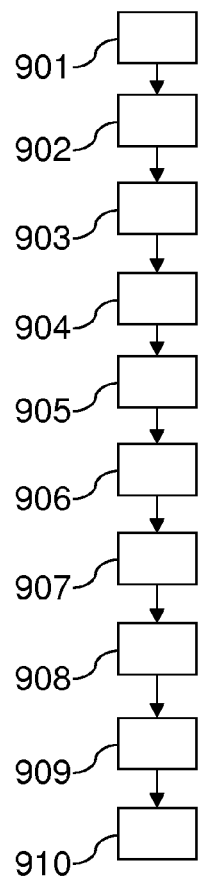

FIG. 9 represents the process of broadcasting digital data from the proprietary entity to the authenticated third party. At a step 901, the third party B launches the application 17 on its terminal 1. The terminal 1 detects the presence of the authentication terminal 3. At a step 902, a strong authentication by the user B is done as described in detail here below. At the end of the step 902, once the user B has been authenticated, its symmetrical encryption key KeS1B associated with its authentication reference is loaded into the server 5. The private digital certificate CePrB is then decrypted by means of this key KeS1B at the step 903. At the step 904, the negotiated digital certificate CeNeaB is decrypted by the means of the private key KprB. At a step 905, the broadcasting key KseB for the broadcasting of the digital data to B is then loaded into the server 5. At the step 906, the encryption key KeS4A is extracted from the certificate CePrA and loaded into the server 5. At the step 907, the access policy certificate CeSeA is decrypted with the key KeS4A. The rights of access are read by the server 5. At the step 908, the server 5 validates access to the digital data for the third party B. This server 5 then loads the storage encryption key KeS2A into memory from the certificate CePrA and decrypts the digital data of the proprietary entity memorized in the base 66. At the step 909, the data to be broadcast are encrypted with the broadcast encryption key KseB. At the step 910, the encrypted data are broadcast to the third party B. The application 17 enables the user of the terminal 1 to whom data have been broadcast to view their content.

Advantageously, the data elements to be broadcast to the third party B are also encrypted with a symmetrical encryption key KeMaB based on the hardware configuration of the terminal 1 and/or the terminal 3 of the third party B. The encryption key KeMaB will be based for example on the physical address of the network card 18 of the terminal 1, on the hard disk drive references of the terminal 1, on a value of the system clock of the terminal 1 or of the terminal 3 or on the references of the processor of the terminal 1. The encryption key KeMaB will typically be generated at each session for accessing the encrypted data. The encryption key KeMaB will be stored for example in the negotiated certificate CeNeAb or in a hardware digital certificate CeMaB.

Preferably, the hardware digital certificate CeMa will comprise at least the following fields:
SN: unique serial number of said digital certificate CeMa;
MAC: physical address of the network card 18 of the terminal 1;
SND: serial number of the hard disk drive 19 corresponding to the terminal 1;
SNP: serial number of the processor 111 of the terminal 1;
SNA: serial number of the authentication device 3 connected to the terminal 1.

When the entity A wishes to broadcast its digital data to itself, it performs the following functions: the strong authentication of A, the decrypting of its private digital certificate with the key KeS1A, the decrypting of its access policy certificate KeSeA with the key KeS4A, the decrypting of its digital data with the key KeS2A, the encryption of the data to be broadcast with the key KeS3A, and then broadcasting of the digital data to A.

Preferably, the authentication phase can be applied to each of the requests transmitted to the server via the fixed or mobile terminal. Each process then comprises initially a strong authentication. The timeline or history of the instants of access to the secured data is especially precise, and each step that could possibly imply access to sensitive data is secured.

As illustrated in FIG. 10, the database 6 comprises a public certificate base 61, a private digital certificate base 62, a negotiated certificate base 63, an access policy certificate base 64, a biometrical reference base 65, an encrypted digital data storage base 66 and a cryptographic protocol base 67.

For reasons of security, the different encryption keys are not provided to the users but only loaded into memory by the server 5 for their use for the different encryption/decryption operators. The server 5 will load the required keys into memory only when an authentication of a user sending out an access request is validated. Thus, the storage of the keys of a private certificate of a first user in its negotiated certificate will not enable a second entitled user of the negotiated certificate to obtain the keys from the first user.

The database 61 comprises the public certificates of the different users of the server 5. The public certificates for which access is not restricted are accessible through a directory or a search engine executed on the server 5. The database of the cryptographic protocol 67 contains different cryptosystems needed to perform the encrypting/decrypting operations in the server 5.

FIG. 11 represents a phase of creation of a new certificate negotiated from two existing negotiated certificates. The holders A and B of the private digital certificates CePrA and CePrB and the holders C and D of the private digital certificates CePrC and CePrD have preliminarily created the negotiated certificates CeNeAb, CeNeaB, CeNeCd and CeNecD respectively. The public certificates CePcAb CePcaB, CePcCd and CePccD corresponding to these negotiated certificates CeNeAb, CeNeaB, CeNeCd et CeNecD are published in a directory. The user B (holding the certificate CeNeaB) and the user C (holding the certificate CeNeCd) wishing to define access to digital data of either of them authenticate themselves with the server 5 and negotiate the creation of new negotiated certificates CeNeaBcd and CeNeabCd. Public certificates CePcaBcd and CePcabCd will enable the users B and C to negotiate again the creation of a negotiated certificate with another entity. Although we have described the solution based on negotiation on the basis of negotiated certificates, the creation and negotiation of a new negotiated certificate could be based on one or more private digital certificates and one or more negotiated certificates.

This process of creation of the new negotiated certificate is not a security flaw for the holders of negotiated certificates who are not taking part in this part in this negotiation: indeed, the use of their negotiated certificate to create a new negotiated certificate does not imply any mutual access to their secured data. Indeed, these holders preserve or keep their access policy certificate to define the rights of access to their digital data elements and may therefore prohibit access to holders of the new negotiated certificate. The new negotiated certificate thus constitutes only one step towards access to the secured data, each holder being free to define the access policy certificate for accessing its own secured data and corresponding to this new negotiated certificate. A procedure of this kind can easily be used to set up tools of broadcasting the digital data of a proprietary entity to a third party, even when it does not yet have total confidence in this third party: the proprietary entity remains free to provide rights of access to the third party gradually, once the proprietary entity is assured of being able to trust third parties.

FIGS. 12 to 18 show examples of exchange datagrams aimed at enabling the broadcasting of the encrypted data.

To carry out the encryption of the digital data broadcast to the authorized third party, this party must first of all have available the symmetrical encryption key used for the broadcasting.

Figure 12:
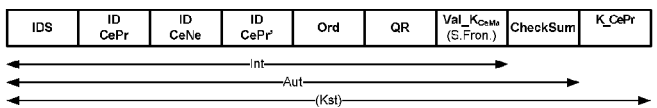
FIGS. 12 to 19 illustrate datagrams.

FIG. 12 represents a datagram of a packet of a request sent by the authorized third party to the server 5 and designed to set up a hardware symmetrical encryption key KCeMa for the broadcasting of the data. The first IDS field is a digital identifier of the data broadcasting session. The second ID field CePr is a unique identifier of the private digital certificate of the proprietary entity. The third ID field CeNe is a unique identifier of the negotiated digital certificate of the proprietary entity with the authorized third party. The fourth ID field CePr' is a unique identifier of the private digital certificate of the authorized third party. The fifth field Ord is the number of the packet from among the different packets designed to set up the hardware encryption key. The sixth field Qr indicates whether the exchange pertains to a request by the user or a response from the server. The integrity of the first seven fields of the packet of FIG. 12 is guaranteed by the checksum field containing an integrity checksum of these fields. The authentication of the eight first fields is guaranteed by the field K_CePr which is a signature of all its fields from the private key contained in the private certificate of the proprietary entity. The set of fields is encrypted by means of a symmetrical encryption key Kst of the terminal 3.

Figure 13:
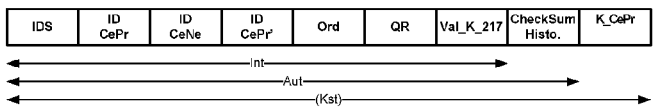

FIG. 13 shows a datagram of a packet of a response transmitted by the server 5 to the authorized third party and intended to give it the symmetrical encryption key used for the broadcasting of data. The first six fields have a function identical to those of the datagram of FIG. 12. The seventh field Val_K_217 contains the broadcasting symmetrical encryption key. This key combines the hardware encryption key transmitted by the authorized third party with a session key located in the negotiated certificate. The field Checksum Histo is a totalized sum of checks on the integrity of all the packets. The authentication of the first eight fields is guaranteed by the field K_CePr which is a signature of the set of these fields from the private key contained in the private certificate of the proprietary entity. The set of fields is encrypted by means of the symmetrical encryption key K_CeMa transmitted in the packet of FIG. 12.

Figure 14:
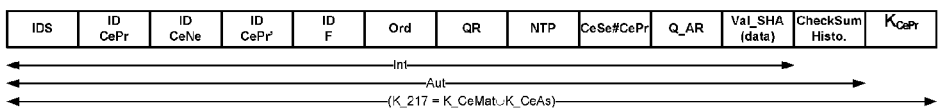

FIG. 14 is a datagram of a packet of a request for acknowledgement of reception of a request for access by the authorized third party to digital data of the proprietary entity. The first four fields of the packet have the same function as the fields of the datagrams of FIGS. 12 and 13. The fifth ID field F contains a digital identifier of a digital field to which access is requested. The sixth and seventh fields correspond to the fifth and sixth fields of the datagrams of FIGS. 12 and 13. The eighth NTP field has a time schedule of an official organization, either given by the terminal 3 or given by an NTP server. The ninth field CeSe#CePr contains an index of encapsulated access policy parameters. The tenth field Q_AR identifies a request for acknowledgement of reception, The eleventh field Val_SHA contains checksum value of the file to be broadcast. The field Checksum Histo is a totalized sum of the checks on integrity of all the packets. The field KcePr is a signature of the set of these fields from a private key contained in the private certificate of the proprietary entity. The set of fields of the packet is encrypted by means of the key K_217.

Figure 15:
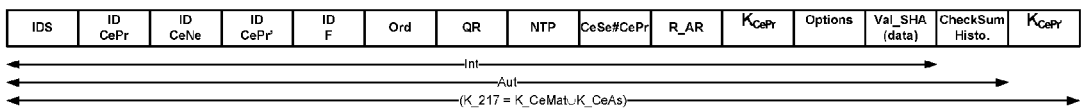

FIG. 15 represents a datagram of a packet of an acknowledgement of reception of the server transmitted to the authorized third party. The nine first fields of the packet have the same function as the fields of the packet of FIG. 14. The tenth field R_AR identifies an acknowledgement of reception. The eleventh field KcePr is a signature of all these fields on the basis of the private key contained in the private certificate of the proprietary entity. The Options field contains a qualification code (validation, archive, okayed etc) of the field to be broadcast and is associated with the signature KcePr'. The field Val_SHA contains the value of the checksum of the file to be broadcast. The Checksum Histo field is a totalized sum of checks on integrity of all the previous packets. The field KcePr' contains a signature of all the previous fields by the private key of the digital certificate of the authorized third party. The set of the fields of the packet is encrypted with the key K_217.

Figure 16:
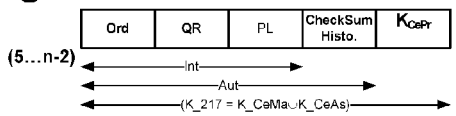

FIG. 16 is a simplified datagram of a packet of the digital data stream of the proprietary entity broadcast to the authorized third party. The first field defines the order of the packet in the stream, the second field identifies the fact that the packet corresponds to a response of the server, the third field comprises the digital data broadcast, the fifth field comprises a totalized sum of the checks on integrity of all previous packets. The field KcePr contains a signature of all the previous fields by the private key of the digital certificate of the proprietary entity. The set of fields of the packet is encrypted with the key K_217.

Figure 17:
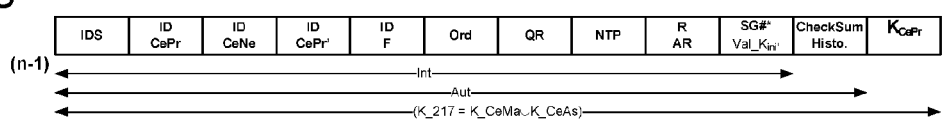

FIG. 17 is a datagram of a packet of a request for acknowledgement of reception of the end of the broadcasting of the digital data transmitted from the authorized third party to the server. The first eight fields of the packet have the same function as the fields of the packets of FIGS. 14 and 15. The ninth field R AR identifies a request for acknowledgement of reception. The field SG# is designed to propagate a new secret key for initializing the server in the terminal 3. This key can be used especially to secure the first exchanges between the terminal and the server 5. The Checksum Histo field is a totalized sum of the checks on integrity of all the previous packets. The field KcePr contains a signature of all the previous fields by the private key of the digital certificate of the proprietary entity. The set of fields of the packet is encrypted with the key K_217.

Figure 18:
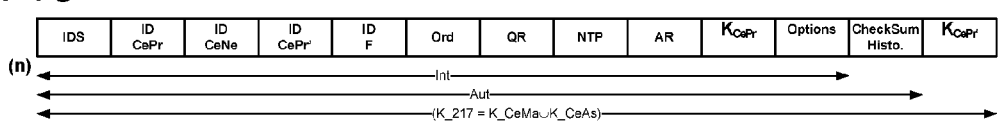

FIG. 18 is a datagram of a packet of an acknowledgement of reception of the end of broadcasting of the digital data transmitted from the server to the authorized third party. The first eight fields of the packet have the same function as the fields of the packet of FIGS. 14 and 15. The ninth field AR identifies an acknowledgement of reception. The field KcePr is a signature of all the previous fields from the private key contained in the private certificate of the proprietary entity. The Options field contains a qualification code of the broadcast field and is associated with the signature KcePr'. The field Val-SHA contains a checksum value of the broadcast field. The Checksum Histo field is a totalized sum of checks on integrity of all the previous packets. The field KcePr' contains a signature of all the previous fields by the private key of the digital certificate of the authorized third party. The set of fields of the packet is encrypted with a key K_217.

Figure 19:
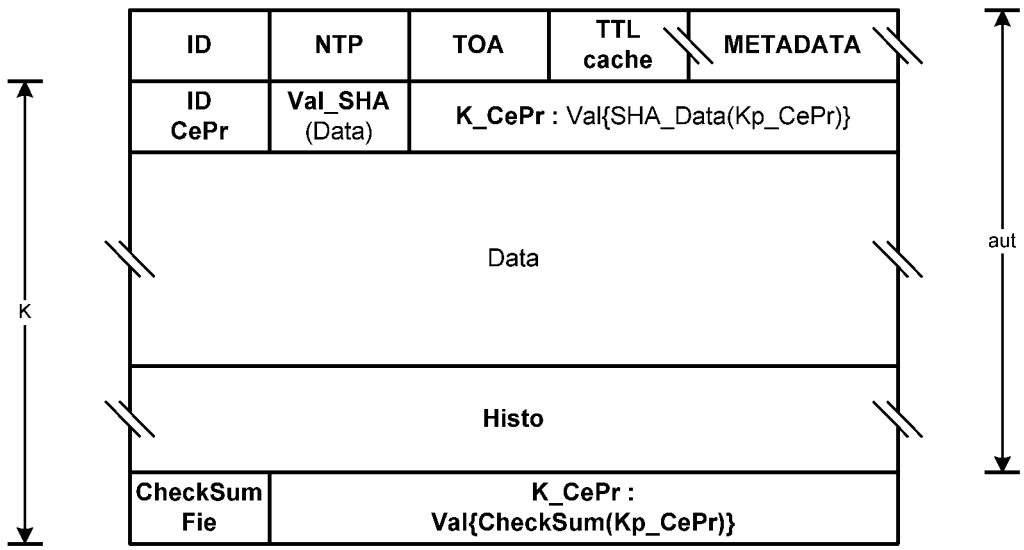

FIG. 19 shows the format for the storage of digital data elements of a proprietary entity during their storage in the server. The ID field corresponds to the identifier of the stored digital data. The NTP field contains timestamp information for the stored data, for example the last date of modification of this data. The TOS field or Type of Service field defines a type of service associated with the data. The TTL cache field defines the lifetime of the digital data stored and facilitates the archiving of this data. The metadata fields contains information for the indexing of stored digital data. The ID CePr field contains the unique identifier of the private digital certificate of the proprietary entity. Val_SHA comprises a value for checking the integrity of the digital data stored. The next field is a signature by the private key of the proprietary entity of all the previous fields. The Data field comprises digital data of the proprietary entity itself. The Histo field comprises the history or timeline of all the instances of access to the stored digital data. The Histo field could especially comprise the datagrams of the FIGS. 15 and 18. The checksum field is a checksum pertaining to the digital data stored. The next field is a signature by the private key of the proprietary entity of all the previous fields.

Figure 21:
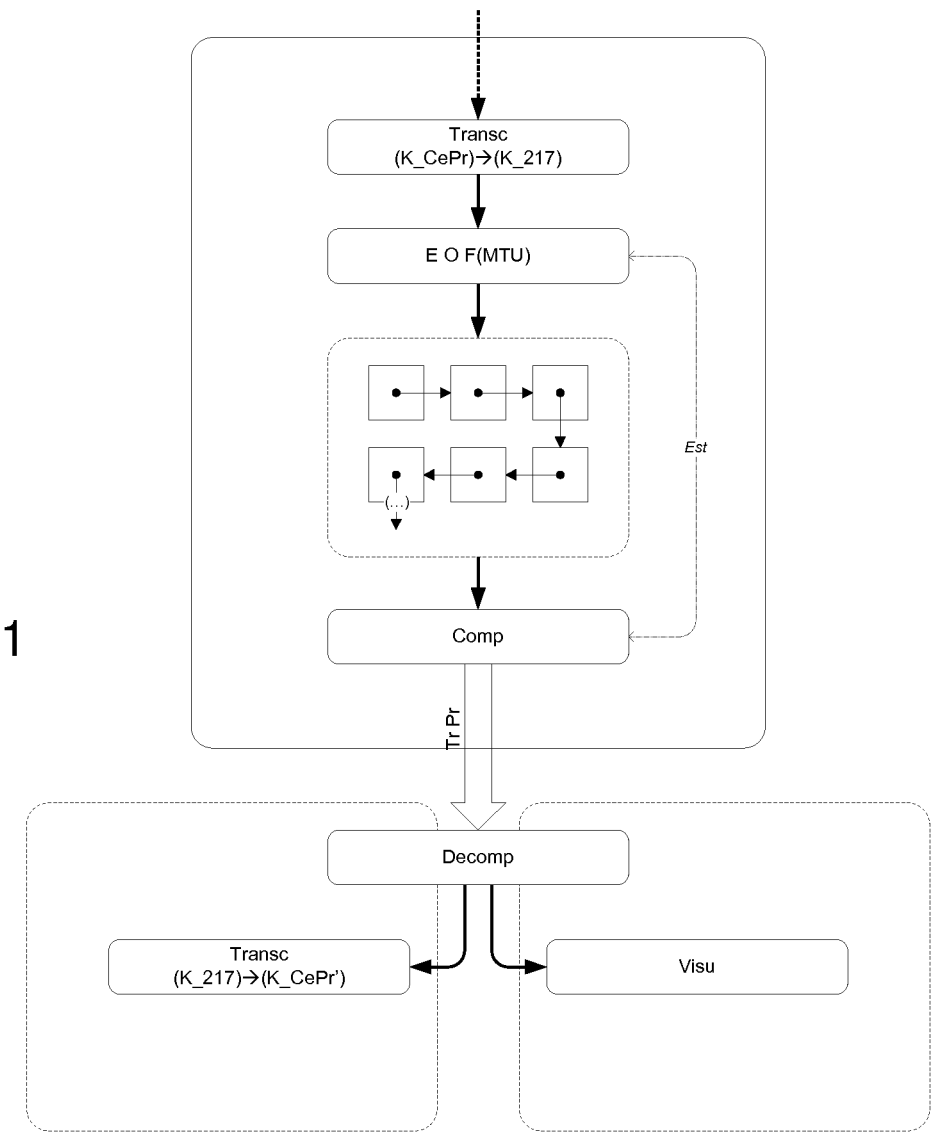
FIG. 21 illustrates a data broadcasting process.

FIG. 21 illustrates a method for broadcasting data to the authorized third party. At a first step, the stored digital data elements of the proprietary entity are decrypted. Data packets intended for broadcasting are formed and are the object of optimized encapsulation. The packets to be broadcast are encrypted by means of the broadcast encryption key of the authorized third party. The data packets are compressed before being broadcast. The terminal of the authorized third party decompresses the received data packets, decrypts the digital data and carries out an encryption for the storage of this data in the terminal. The pieces of data are transmitted to a module in order to be viewed by the authorized third party.

In the example, the server 5 is accessible to users by means of the Internet. It is also possible to envisage a case where the server 5 is a company server accessible in a local area network. The server 5 does not enable the viewing and access to a private digital certificate except to its own proprietary entity.

In the example, although only one server has been illustrated, the functions fulfilled can be distributed among different servers. Similarly, although only one database 6 has been illustrated, the different contents described could be stored in different remote databases. Advantageously, all the above-mentioned digital certificates (CePr, CePu, CeNe, CeSe, CeMa) are stored on one or more remote secured servers in a database according to an adapted client/server architecture.

The invention claimed is:

1. A method of secured broadcasting of encrypted digital data of a proprietary entity comprising:
    authenticating via processor a third party requesting the broadcasting of the encrypted digital data of the proprietary entity;
    decrypting via processor a private digital certificate of the third party with a first symmetrical encryption key dedicated to the third party, wherein the private digital certificate of the third party is stored in computer memory and includes a pair of asymmetrical encryption keys;
    decrypting via processor a digital certificate negotiated with the proprietary entity with the private key of the said pair of asymmetrical encryption keys, wherein the digital certificate negotiated with the proprietary entity is stored in computer memory and includes a symmetrical encryption key for the broadcasting of the data to the third party;
    reading an access policy certificate prepared by the proprietary entity via a data access device, wherein the access policy certificate defines the rights of access to the encrypted digital data of the proprietary entity and is stored in computer memory;
    decrypting via processor the encrypted digital data with a storage symmetrical encryption key contained in a private digital certificate of the proprietary entity if the access policy certificate authorizes the third party to access the encrypted digital data of the proprietary entity, wherein the private digital certificate of the proprietary entity is stored in computer memory;
    encrypting via processor the digital data with the symmetrical encryption key for the broadcasting of the digital data to the third party; and
    broadcasting the digital data encrypted with the symmetrical encryption key for the broadcasting of the digital data to the third party via a communication device.

2. The method of claim 1, further comprising decrypting via processor the access policy certificate with a symmetrical encryption key contained in the private digital certificate of the proprietary entity.

3. The method of claim 2, wherein the symmetrical encryption key used to decrypt the access policy certificate is distinct from the storage symmetrical encryption key.

4. The method of claim 3, wherein the obtaining of the storage symmetrical encryption key includes decrypting via processor the private digital certificate of the proprietary entity with a first symmetrical encryption key dedicated to the proprietary entity.

5. The method of claim 4, further comprising:
    entering identity information relating to the identity of the proprietary entity owning the encrypted digital data via a computer implemented input device;
    generating via processor the private digital certificate of the proprietary entity, wherein the private digital certificate of the proprietary entity includes the identity information and the storage symmetrical encryption key;
    entering an authentication reference for the proprietary entity into computer memory;
    generating via processor the first symmetrical encryption key dedicated to the proprietary entity and associating this key with the authentication reference entered for the proprietary entity;
    encrypting via processor the private digital certificate of the proprietary entity with the said first symmetrical encryption key; and
    storing the encrypted private digital certificate of the proprietary entity in computer memory.

6. The method of claim 5, further comprising the steps of:
    defining via processor encryption parameters of the proprietary entity for storing and accessing the encrypted digital data; and
    generating via processor the first symmetrical encryption key dedicated to the proprietary entity and the storage symmetrical encryption key as a function of the defined encryption parameters.

7. The method of claim 6, further comprising the steps of:
    retrieving via processor device information on the hardware configuration of a third party terminal;
    generating via processor a device symmetrical encryption key based on the information;
    storing the device symmetrical encryption key in the negotiated digital certificate; and
    encrypting via processor the digital data to be broadcasted with the device symmetrical encryption key.

8. The method of claim 7, further comprising the steps of:
    generating via processor a public digital certificate of the proprietary entity, wherein the public digital certificate is stored in computer memory, and is mathematically related to the private digital certificate of the proprietary entity;
    indexing information pertaining to the proprietary entity; and
    making the public digital certificate of the proprietary entity available on a search engine for a third party to identify and consult when information pertaining to the proprietary entity is entered by the third party.

9. The method of claim 8, wherein the proprietary entity defines restrictions on consultation of its public digital certificate for certain categories of third parties in which the search engine prevents the consultation of the public digital certificate of the proprietary entity for these categories of third parties.

10. The method of claim 9, further comprising the steps of:
    generating via processor a public digital certificate of the third party and storing the public digital certificate in computer memory, wherein the public digital certificate is mathematically related to the private digital certificate of the third party;
    indexing information pertaining to the third party; and
    making available of a search engine for the proprietary entity or other third parties to identify and consult the public digital certificate of the third party by the entry of information pertaining to the third party by the proprietary entity or the other third parties.

11. The method of claim 10, wherein the private digital certificate of the proprietary entity includes a symmetrical broadcasting encryption key for a method of broadcasting encrypted digital data to the proprietary entity, wherein the method of broadcasting includes (i) requesting for access by the proprietary entity to its encrypted digital data, (ii) authenticating via processor the proprietary entity, (iii) decrypting via processor the encrypted digital data with the storage symmetrical encryption key, (iv) encrypting via processor the digital data with the symmetrical broadcasting encryption key for broadcasting to the proprietary entity, and (v) broadcasting via a communication device the encrypted digital data to the proprietary entity.

12. The method of claim 11, further comprising storing a timeline of instances of access to the encrypted digital data of the proprietary entity in computer memory.

13. The method of claim 12, further comprising including a history or timeline of the instances of access to the digital encrypted data in the digital data broadcast to the authenticated third party.

14. The method of claim 3, further comprising the steps of:
    entering via a computerized input device information relating to the identity of the third party;
    generating via processor the private digital certificate of the third party containing said information relating to the identity of the third party containing the pair of asymmetrical encrypting keys;
    entering via a computerized input device an authentication reference of the third party and storing the authentication reference of the third party in computer memory;
    generating via processor the first symmetrical encryption key dedicated to the third party and associating the key with the authentication reference of the third party; and
    encrypting via processor the private digital certificate of the third party with the first symmetrical encryption key and storing the encrypted private digital certificate in computer memory.

15. The method of claim 14, further comprising the steps of:
    authenticating via processor the proprietary entity and the third party; and
    defining broadcasting encryption parameters for digital data of the proprietary entity, and generating the negotiated digital certificate including the encryption parameters, wherein the encryption parameters are defined by the proprietary entity and the third party.

16. The method of claim 15, further comprising:
    generating via processor another digital certificate negotiated between a first entity from the third party and the proprietary entity and another third party;
    publishing a public digital certificate associated with the said negotiated digital certificate;
    identifying, by a second entity from the third party and the proprietary entity, of the said negotiated digital certificate.

17. The method of claim 16, further comprising the steps of:
    authenticating via processor the proprietary entity;
    entering via an input device parameters of rights of access to the encrypted digital data of the proprietary entity, the rights of access defining third parties to whom the digital data can be broadcast and defining the type of access by third parties to the digital data;

generating via processor the access policy certificate as a function of the parameters and storing the access policy certificate in computer memory.

18. A system for secured broadcasting of encrypted digital data comprising:
- an encrypted digital data storage medium hosted in a server;
- an authentication module hosted in the server for authentication of users;
- a private digital certificate storage module hosted in the server for storing certificates for users, each private digital certificate including a first symmetrical encryption key, a pair of asymmetrical encryption keys and a storage symmetrical encryption key for users;
- a storage module hosted in the server for storing digital certificates negotiated between two users, each negotiated digital certificate including a symmetrical encryption key for the broadcasting of the digital data of one of the two users to the other of the two users;
- a storage module hosted in the server for storing access policy certificates that define the rights of access to the digital data of a user by another user; and
- an encryption/decryption module hosted in the server for:
  - decrypting the private digital certificate of a first user with its first asymmetrical encryption key after authentication;
  - decrypting a digital certificate negotiated with a second user with the private key of the pair of asymmetrical encryption keys of the first user;
  - reading an access policy certificate for the digital data defined by the second user, wherein the encryption/decryption module is configured to execute the following steps if the first user has a right of access to the digital data of the second user: (i) decrypting digital data with the storage decryption key of the second user, (ii) encrypting the digital data with the broadcasting symmetrical encryption key of the first user, and (iii) broadcasting the digital data encrypted with the broadcasting symmetrical encryption key of the first user to the first user.

* * * * *